(12) United States Patent
Santos et al.

(10) Patent No.: US 7,512,066 B2
(45) Date of Patent: Mar. 31, 2009

(54) CONGESTION CONTROL SYSTEM

(75) Inventors: Jose Renato Santos, San Jose, CA (US);
Yoshio Turner, Redwood City, CA (US);
Gopalakrishnan Janakiraman,
Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 734 days.

(21) Appl. No.: 10/814,073

(22) Filed: Mar. 30, 2004

(65) Prior Publication Data
US 2005/0226150 A1    Oct. 13, 2005

(51) Int. Cl.
*G06F 11/00* (2006.01)
*G06F 15/16* (2006.01)
*H04L 12/56* (2006.01)

(52) U.S. Cl. .......... 370/230; 370/231; 370/395.64; 370/400; 709/235

(58) Field of Classification Search ........... 370/229, 370/230–237, 392, 389, 395.64, 253, 400–402; 455/450, 455; 709/235
See application file for complete search history.

(56) References Cited

U.S. PATENT DOCUMENTS

| | | | | |
|---|---|---|---|---|
| 6,424,624 B1 * | 7/2002 | Galand et al. | ............... | 370/231 |
| 6,622,172 B1 * | 9/2003 | Tam | ........................... | 709/232 |
| 6,850,488 B1 * | 2/2005 | Wesley et al. | ............... | 370/230 |
| 6,904,286 B1 * | 6/2005 | Dantu | ..................... | 455/452.2 |
| 7,136,353 B2 * | 11/2006 | Ha et al. | ..................... | 370/230 |

* cited by examiner

*Primary Examiner*—Afsar M. Qureshi

(57) ABSTRACT

According to the present invention, there is provided a method for controlling congestion in a communications network, the method including receiving congestion feedback data relating to said network, adjusting at least one of a window limit and a rate limit based on said congestion feedback data and injecting data packets onto said network according to said window limit and said rate limit.

20 Claims, 11 Drawing Sheets

CONGESTION CONTROL SYSTEM

FIELD OF THE INVENTION

The present invention relates generally to computer networks and in particular, to a system and process for controlling network congestion in a communications network.

BACKGROUND

Network congestion arises when traffic sent or injected into a communications network (i.e., the number of injected packets or bytes per unit of time) exceeds the capacity of the network. Congestion causes the throughput of useful data traffic (i.e., traffic that reaches its destination) to be reduced because when the network is congested, packets hold onto network resources for longer times and/or network resources are consumed by packets that are later discarded. Network congestion is typically controlled by mechanisms for detecting congestion and by adjusting the amount of data traffic injected at the end nodes.

Congestion detection processes can be implemented at endpoints or at internal components of the network, such as switches or routers. As described in V. Jacobson "Congestion avoidance and control" *ACM SIGCOMM* 88, pp. 314-329, August 1988 ("Jacobson"), flow sources using the Transport Control Protocol (TCP) rely on endpoint detection of network packet dropping as an implied signal of congestion. An alternative approach is to detect congestion at network switches or routers by, for example, observing if the switch buffer occupancy exceeds a desired operating point. However, this approach requires an Explicit Congestion Notification (ECN) mechanism that notifies endpoints of the state of network congestion so that their data traffic injection properties can be adjusted accordingly.

In many ECN implementations (e.g., DEC's implementation described in K. K. Ramakrishnan, R. Jain "A Binary Feedback Scheme for Congestion Avoidance in Computer Networks" *ACM Transactions on Computer Systems* Vol. 8 No. 2, pp. 158-181, 1990; and Random Early Detection (RED) as described in S. Floyd, V. Jacobson "Random Early Detection Gateways for Congestion Avoidance" *IEEE/ACM Transactions on Networking* Vol. 1 No. 4, pp. 397-413, August 1993), switches mark ECN bits in packet headers to notify the destination nodes of congestion, thus avoiding the use of special control packets dedicated to carrying congestion information. The destination node, in turn, piggybacks the congestion marker on acknowledgment (ACK) packets, which are used in most transport protocols, such as TCP, to acknowledge the receipt of data packets by the destination node.

Typically, when congestion is detected, a source node adjusts the injection properties by decreasing the packet injection rate, and conversely, slowly increasing the packet injection rate when there is no congestion. Congestion response mechanisms generally control data traffic injection on the network in one of two ways. One way is to limit the number of packets that can be concurrently in transit in the network between a pair of communicating source and destination nodes. For example, as described in Jacobson, congestion control in TCP is achieved by using a window-based congestion control technique which dynamically adjusts the window limit. Source nodes implementing the window control technique typically uses ACK packets, which are part of the network transport protocols, to determine and control the number of packets that are in transit or "flight" to the destination node via the network. By blocking packet transmission whenever the number of unacknowledged packets reaches a threshold, the source node can bound the number of packets that can be concurrently in flight in the network, effectively controlling the rate of packet injection.

An alternative to window control is the rate control technique. Rate control involves controlling the rate at which the source node injects packets into the network, or equivalently, the time interval between packets injected into the network. This is further described in ATM Forum Technical Committee "Traffic Management Specification Version 4.0", (http://www.atmforum.com/pages/aboutatmtech/approved.html), af-tm-0056.000, April 1996.

Window-based congestion control mechanisms offer self-clocked packet injection and the advantages are further discussed in Jacobson. Generally, the window limits the amount of buffering that a flow, ie a data stream, can consume, thus preventing the further injection of packets into the network when acknowledgments for transmitted packets stored in the buffer stop arriving. By limiting the amount of network resources (e.g., network buffers) used by multiple contending flows, a window-based mechanism can effectively control congestion. However, when the number of contending flows is large or when the size of switch buffers is small, the average network buffer utilization for each flow may have to be set at values lower than the size of one packet in order to avoid congestion. This is not possible to achieve by a pure window control mechanism since the minimum window size is the size of one data packet.

On the other hand, a rate-based response mechanism allows flows to have an average buffer utilization of less than a single data packet and is more suitable for situations where the number of flows is relatively large when compared with the number of buffer slots on the network switches. This is a likely scenario in high-speed system area networks, for example as described in Infiniband Trade Association "Infiniband Architecture Specification Release 1.0.a" (http://infinibandta.org), in which switch buffers can only hold a few data packets per port. However, a pure rate-based mechanism does not have self-clocking properties and may therefore continue injecting data packets into the network even when the network is congested and ACK packets, or congestion notification messages, stop arriving due to long network delays.

It is desired to provide a system and process for controlling network congestion that alleviates one or more of the above difficulties, or at least provides a useful alternative to existing network congestion control systems and processes.

SUMMARY OF THE INVENTION

According to the present invention, there is provided a method for controlling congestion in a communications network, the method including receiving congestion feedback data relating to said network, adjusting at least one of a window limit and a rate limit based on said congestion feedback data and injecting data packets onto said network according to said window limit and said rate limit.

These and other aspects of the present invention will be apparent to those of ordinary skill in the art after having read the following detailed description with reference to the drawings.

BRIEF DESCRIPTION OF THE DRAWINGS

Various embodiments of the present invention are hereinafter described, by way of example only, with reference to the accompanying drawings, wherein.

DETAILED DESCRIPTION

Figure 1:
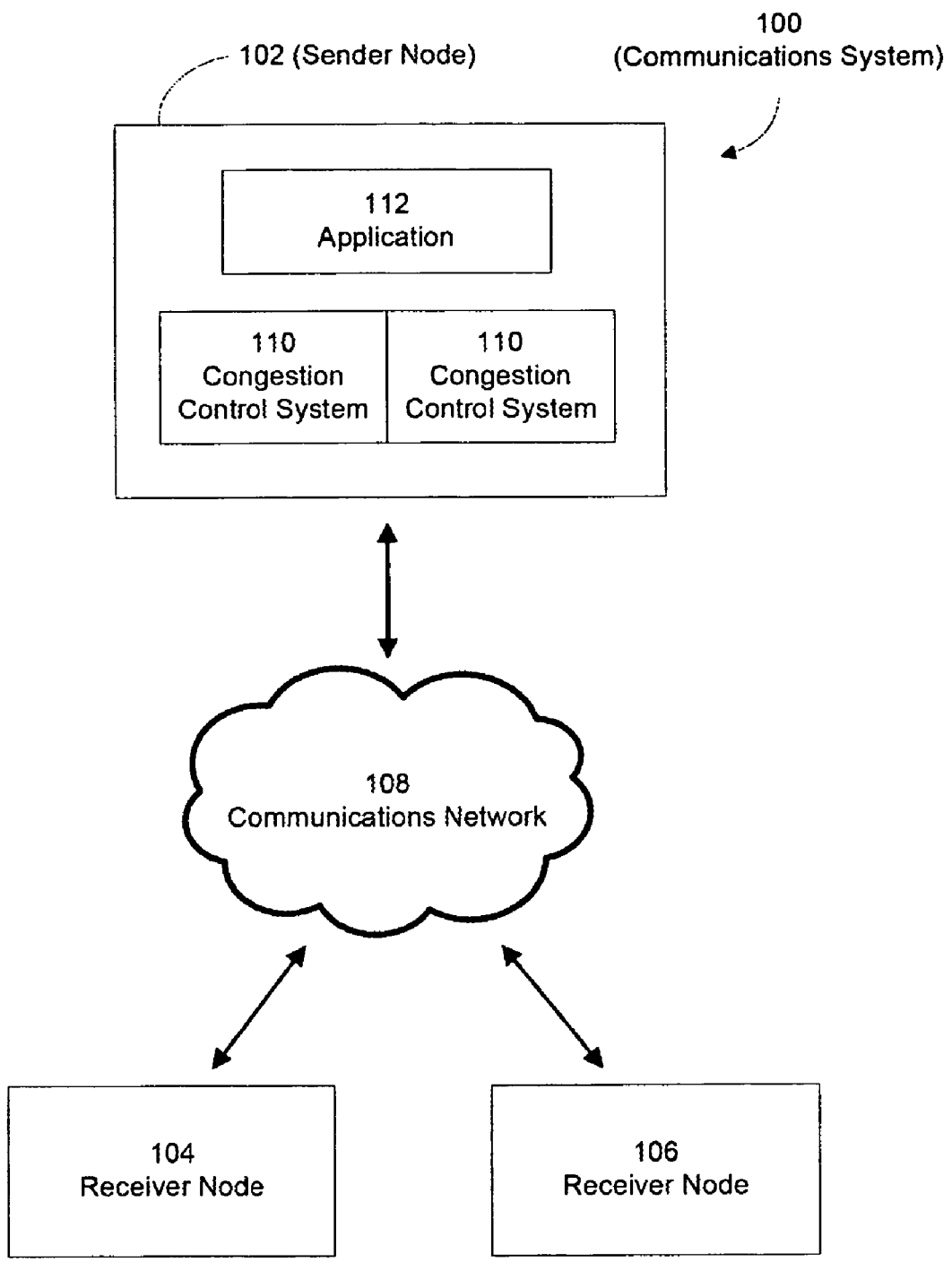
FIG. 1 is a block diagram of a communications network in accordance with an embodiment of the present invention.
Figure 2:
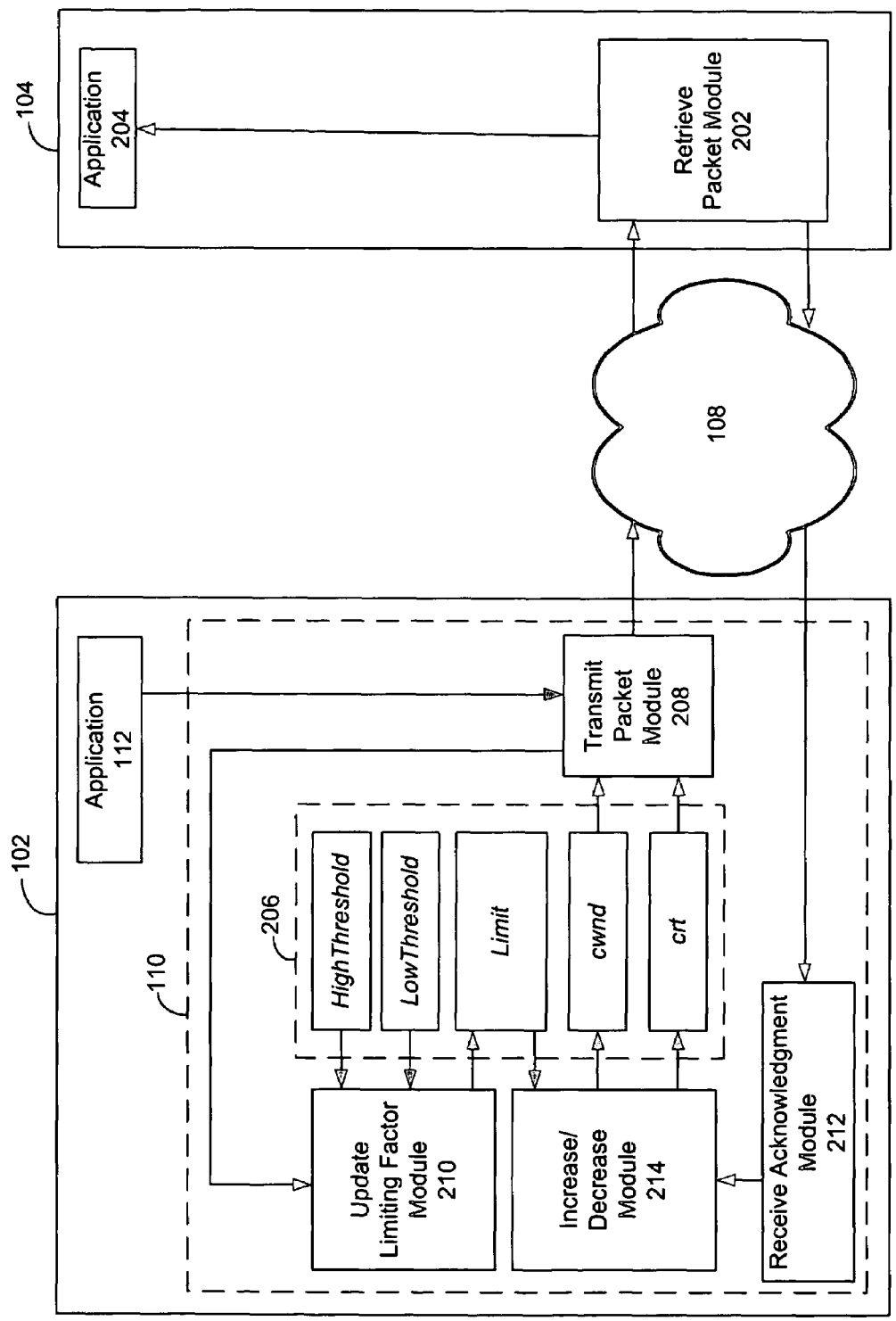
FIG. 2 is a block diagram of the sender node communicating with one of the receiver nodes in accordance with an embodiment of the present invention.

A communications system 100, as shown in FIG. 1, includes a sender node 102 (e.g., a computer, I/O device or a network interface that connects a computer or I/O device to a network) that communicates with one or more receiver nodes 104, 106 via a communications network 108. The sender node 102 includes one or more implementations or instances of a congestion control system 110. Each congestion control system 110 facilitates transmission of a stream of data (or flow) from the sender node 102 to a single receiver node 104, as shown in FIG. 2. The congestion control system 110 works with an underlying reliable transport protocol that uses ACK packets to acknowledge successful delivery of data packets to the destination.

The congestion control system 110 shown in FIG. 2 receives data from an application 112 executed on the sender node 102, or on a separate node communicating with the sender node 102, and transmits data as packets to a receiver node 104. The receive packet module 202 on the receiver node 104 retrieves incoming packets from the network 108 and sends the data contained in the packets to an application 204. For each packet received, the receive packet module 202 generates and sends a confirmation acknowledgment (ACK) packet back to the sender node 102 via the network 108.

As shown in FIG. 2, the congestion control system 110 includes a transmit packet module 208, update limiting factor module 210, receive acknowledgment module 212 and increase/decrease module 214 and memory 206. The receive acknowledgment module 212 receives ACK packets from the network 108 and determines whether each packet is associated with an increase or decrease event. This triggers the increase/decrease module 214 to do one of two things. If the ACK packet is associated with an increase event, the increase/decrease module 214 responds by determining a current limiting factor using Limit (a variable retrieved from memory 206) and adjusts the window limit, rate limit or both of those limits based on the current limiting factor. Alternatively, if the ACK packet is associated with a decrease event, the increase/decrease module 214 responds by adjusting both the window limit and the rate limit.

The updated window and/or rate limits are stored in memory 206. The transmit packet module 208 retrieves the window and rate limits from memory 206 and regulates the sending of data packets using these limits. Whenever a data packet is transmitted to the receiver node 104, the transmit packet module 208 determines the factor (i.e., the window limit or rate limit) that delayed the sending of the last data packet. This triggers the update limiting factor module 210 to determine a new value for Limit depending on whether the window limit or rate limit was responsible for delaying the transmission. Limit is set to a value between an upper and lower bound defined by the constants HighThreshold and LowThreshold, which are stored in memory 206. The value of Limit in memory 206 is updated by the update limiting factor module 210.

As will be understood by those skilled in the art, the processes executed by the modules of the congestion control system 110 can be implemented in software, hardware or a combination of the two, and can also be executed at least in part by dedicated hardware circuits, e.g., Application Specific Integrated Circuits (ASICs).

To ensure rapid response to changes in network conditions, the implementation of the modules needs to be fast enough to adjust the value of the rate limit (crt) and/or the window limit (cwnd) each time an ACK packet arrives from the network. In a high speed network, the time between consecutive ACK packet arrivals at a sender node may be very short (on the order of a few tens or hundreds of nanoseconds). Since the rate/window increase/decrease functions, described below, may be complex and involve time-consuming computational operators such as floating point division or exponentiation, there may not be sufficient time to execute the operation unless ASICs are used. As a less costly alternative, each function can be pre-computed at design time for all possible settings of crt and cwnd and the results stored in a two-dimensional memory lookup table that is indexed by crt and cwnd. The source system 110 can determine the correct adjustment to the rate and/or window limits by performing fast accesses to the appropriate memory lookup tables.

The congestion control system 110 integrates window and rate control in a single hybrid mechanism that provides the benefits of both approaches. In particular, the system 110 is effective for controlling network congestion over a large number of flows and also provides self-clocking properties (i.e., the ability to control the inter-packet delay for each flow). The congestion control system 110 maintains a window limit and rate limit for each flow, and simultaneously controls these two limits in a coordinated manner. A new data packet for a flow can only be injected into the network when permitted by both its window limit and rate limit.

The congestion control system 110 includes a congestion detection mechanism, which provides feedback on the congestion state of the network. This feedback is used to determine whether the packet injection rate for each flow should be increased or decreased. Several congestion detection mechanisms are known in the prior-art, including explicit congestion notification (ECN) from network switches and packet loss detection at end nodes. The congestion control system 110 is able to work with any of the existing congestion detection mechanisms.

The congestion control system 110 also includes mechanisms for controlling the window size and packet injection rate. While the rate control and window control mechanisms can each be arbitrarily selected, by choosing one of them the other becomes fixed since both mechanisms are coupled. Equations 6 and 11, as described below, define the relationship between the rate control and window control functions. As shown in equation 6, the functions for decreasing the rate and window limits (i.e., DecreaseWindow( ) and DecreaseRate( )) are in the ratio of $$\frac{cwnd}{crt}.$$

Similarly, equation 11 shows that the functions for increasing the rate and window limits (i.e., Increasewindow( ) and IncreaseRate( )) are also in the ratio of $$\frac{cwnd}{crt}.$$

In both equations 6 and 11, the ratio $$\frac{cwnd}{crt}$$

is determined according to equation 3.

The congestion control system 110 also includes processes 500, 600, 700, 800, and 900, as shown in FIGS. 5, 6, 7, 8 and 9, for adjusting the window limit and the rate limit in a coordinated manner. The rate and window limits set by their respective control mechanisms are adjusted in a coordinated way so that each of them converges as closely as possible to the ideal packet injection behaviour, i.e. one that reduces congestion while sustaining high network utilization. The window limit and rate control limit are increased or decreased depending on the current network state and on the flow state. A flow can inject packets into the network only if this is permitted by both the window and rate limits. Coordinated control of the window limit and rate limit requires the identification of which of these two limits is limiting the transmission of new packets at any instant. Only one mechanism for determining the current limiting factor is described herein. However, the present invention is not limited to this single mechanism as it is possible to define several alternative mechanisms achieving the same result which can be used with the present invention.

Generally, the congestion control system 110 controls the injection of data packets into the network based on the current network congestion state. The system 110 assumes the existence of a congestion detection mechanism that indicates the congestion state of the network to the endpoints, but does not require any specific congestion detection mechanism. To abstract the details of the particular congestion detection mechanism, a congestion detection mechanism generally provides two events that are useful in the context of the present invention. A decrease event is an event triggered either by an explicit congestion notification (ECN) received from the network (either embedded in an ACK packet or in a separate message) or by the endpoint local congestion detection mechanism, depending on which type of congestion detection is being used. An increase event is the result of receiving an ACK packet that does not carry an explicit congestion notification or trigger for the local congestion detection mechanism, which are indicators of a non-congested network. Continuous reception of ACK packets that do not indicate congestion are treated as events used to increase the flow's rate and/or window limit. In an embodiment, an ACK packet can only trigger one type of event.

The congestion control system 110 controls data packet traffic injection on a per flow basis. A flow is a unidirectional association between a source and a destination endpoint used to transfer data from the source to the destination. Each flow is associated with both a window control state and a rate control state and means for inhibiting the flow by regulating the injection of packets into the network based on these controls. There are three congestion control state variables associated with each flow at the source end point. The first is the window limit (cwnd) which indicates the maximum number of transmitted bytes that can be waiting for acknowledgment. A flow cannot transmit new data packets when this limit is reached and waits until an ACK packet is received, which reduces the amount of unacknowledged transmitted data for that flow. The minimum window limit value is equal to the maximum amount of data that can be carried by a single data packet, i.e., the size of one Maximum Transfer Unit (MTU). Another control state variable is the flow's normalized rate limit (crt) which is normalized by the maximum flow rate and the value of which is limited by the network link bandwidth such that $0 < crt \leq 1$. In an embodiment, the flow's rate is adjusted by controlling the minimum delay inserted between the injection of consecutive packets of a particular flow. This delay is called the inter-packet delay (IPD) and is defined in Equation 1:

$$IPD = txtime * \left(\frac{1}{crt} - 1\right) \quad (1)$$

where, txtime is the transmission time of the last data packet. However, the congestion control system 110 does not require the flow rate to be adjusted by only an IPD mechanism. Other methods for controlling the flow rate can be used with the congestion control system 110. Another control state variable is the current window (wnd), i.e., the amount of data that was transmitted and not acknowledged yet, in units of bytes. The condition $wnd \leq cwnd$ must always be satisfied.

Given the current network conditions, the optimal rate $r_{opt}$ is the ideal rate for the flow. To effectively control congestion, the window control and the rate control mechanisms should adjust cwnd and crt, respectively, such that the flow rate approaches the optimal rate. To achieve this, the optimal values for cwnd and crt should satisfy the following equation:

$$r_{opt} = crt * rate_{max} = \frac{cwnd}{RTT} \quad (2)$$

where, RTT is the mean round trip time and $rate_{max}$ is the maximum flow rate.

Ideally, both cwnd and crt should limit the flow rate to the same optimal rate $r_{opt}$. In an embodiment, the congestion control system 110 causes the flow rate to converge towards the optimal rate in a coordinated way such that cwnd and crt converge to equivalent values (i.e., both cwnd and crt limits the actual flow rate to approximately the same value). This is achieved when cwnd and crt satisfies the following relation:

$$\frac{cwnd}{crt} = rate_{max} * RTT \qquad (3)$$

The adjustment of cwnd and crt must account for the fact that the round trip time (RTT) continuously varies depending on the state of the network. The way in which the rate limit and window limit changes such that they converge to equivalent values is controlled by the type of increase and decrease functions used in response to increase and decrease events respectively.

A decrease event indicates that either the window limit or rate limit control component, whichever is currently limiting packet injection, must be tightened even further. Since the other control component is enforcing looser limits, its limits must be tightened as well. Hence, upon the occurrence of a decrease event, the source node responds by decreasing both the flow's rate limit and window limit using a pair of functions:

$$cwnd_{new} = DecreaseWindow(crt, cwnd) \qquad (4)$$

$$crt_{new} = DecreaseRate(crt, cwnd) \qquad (5)$$

An arbitrary decrease function can be chosen for either the rate or the window limit, but once one is chosen the other is automatically defined by the following relation:

$$\begin{matrix} DecreaseWindow \\ (crt, cwnd) \end{matrix} = \frac{cwnd}{crt} * DecreaseRate(crt, cwnd) \qquad (6)$$

This constraint on the decrease functions ensures that the limiting factor does not change after both the window and the rate limit are decreased, assuming the average network round trip time does not change. Thus, if both cwnd and crt are equivalent limits before the adjustment they continue to be after the adjustment.

While a decrease adjustment reduces both the window and rate limit, increase adjustments need adjust only the window or rate control component that is limiting packet injection. Both the window and rate control may be adjusted on a single increase event only if both limits are more or less equally limiting. This ensures that cwnd and crt converge to equivalent values.

On each data packet transmission, the factor that most hinders the injection (window or rate limit) is sampled and recorded. Upon an increase event a decision is made with respect to which limit should be increased. For example, in the CurrentLimitingFactor( ) function shown in pseudocode on page 29, the factor limiting the flow's packet injection is determined based on the recent recorded history of sent data packets. The function CurrentLimitingFactor( ) can return three possible results which are associated with different adjustment decisions. If the function returns RateLimit as the current limiting factor, only the rate limit needs to be increased, e.g., using the AdjustRate( ) function shown in pseudocode on page 30 as follows:

$$crt_{new} = AdjustRate(crt, cwnd) \qquad (7)$$

If the function returns WindowLimit as the current limiting factor, only the window limit needs to be increased, e.g., using the Adjustwindow( ) function shown in pseudocode on page 30 as follows:

$$cwnd_{new} = AdjustWindow(crt, cwnd) \qquad (8)$$

If the function returns RateAndWindowLimit as the current limiting factor, both the window and rate limits are limiting the flow rate, i.e., cwnd and crt are approximately equivalent. In this case both the window limit and the rate limit need to be increased, e.g., using the Increasewindow( ) and IncreaseRate( ) functions shown in pseudocode on page 30 as follows:

$$cwnd_{new} = IncreaseWindow(crt, cwnd) \qquad (9)$$

$$crt_{new} = IncreaseRate(crt, cwnd) \qquad (10)$$

As in the case of window and rate decrease, the IncreaseWindow( ) and IncreaseRate( ) functions should satisfy the following relation:

$$\begin{matrix} IncreaseWindow \\ (crt, cwnd) \end{matrix} = \frac{cwnd}{crt} * IncreaseRate(crt, cwnd) \qquad (11)$$

Although in one embodiment the functions AdjustWindow( ) and AdjustRate( ) are the same as functions IncreaseWindow( ) and IncreaseRate( ) respectively, as shown in pseudocode on page 31, they do not need to be the same. Moreover, there is no required relation between the increase functions used to adjust just a single limit, i.e., AdjustWindow( ) and AdjustRate( ).

Figure 3:
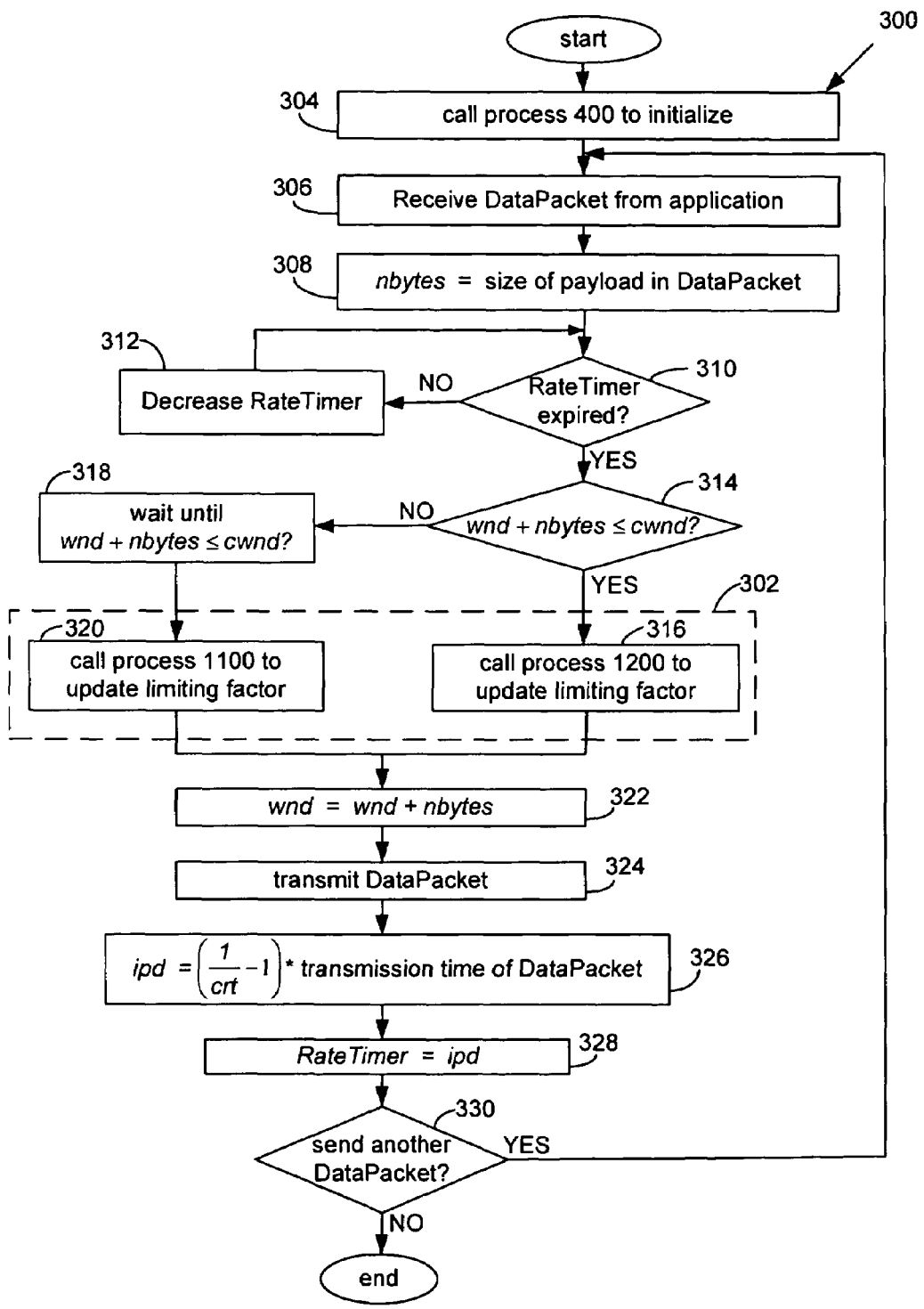
FIG. 3 is a flow diagram of the process in an embodiment of the present invention for delaying the injection of packets into the network using both the window limit and rate limit.

The processes performed by each module of the congestion control system 110, as shown in FIG. 2, will now be described in more detail. The flow diagram in FIG. 3 shows the process 300 for delaying the injection of packets into the network using both the window limit and the normalised rate limit for a flow. Process 300 corresponds to the Send( ) function, as shown in pseudocode on page 28, and is executed in the transmit packet module 208. Every time a data packet is transmitted, the factor that delayed that packet is recorded by the function UpdateLimitingFactor( ), as shown in pseudocode on page 30. The steps included in box 302 correspond to the UpdateLimitingFactor( ) function and are executed in the update limiting factor module 210.

Figure 4:
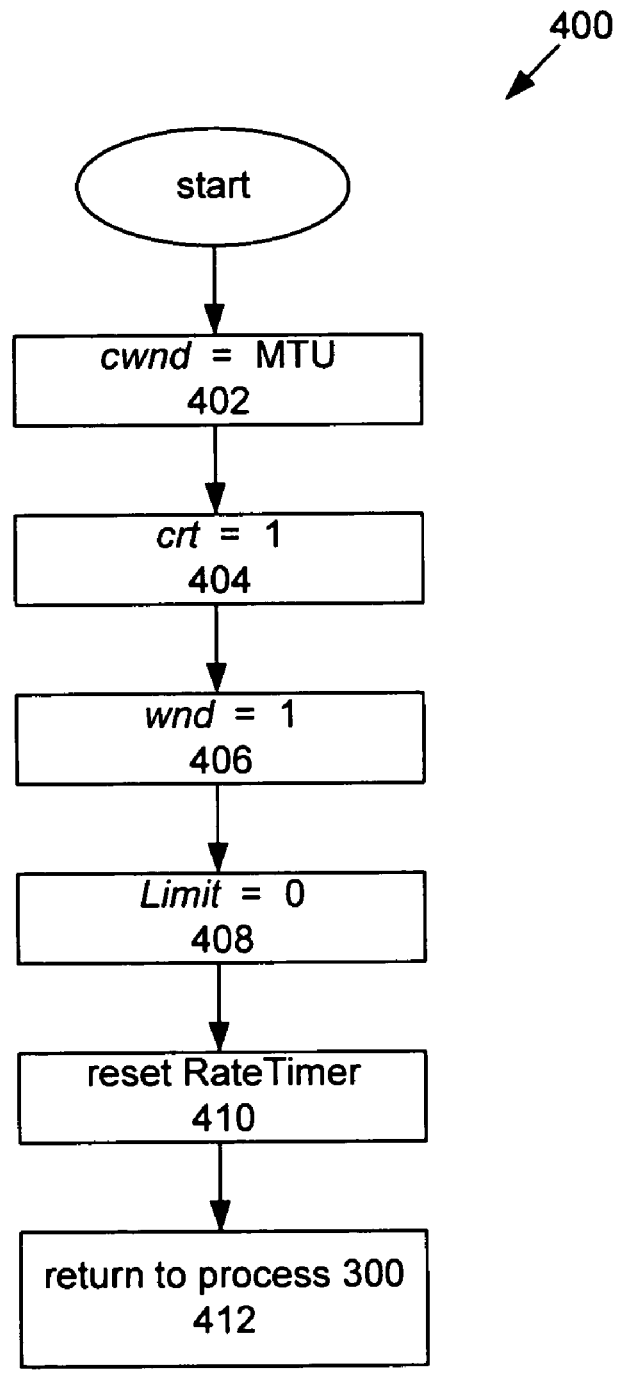
FIG. 4 is a flow diagram of an initialization process in an embodiment of the present invention.

Process 300 begins at step 304 by the initialization process 400, as shown in FIG. 4. At step 402, the window limit (cwnd) is set as the size of the Maximum Transfer Unit (MTU). At steps 404 to 408, the normalized rate limit (crt), window size (wnd) and variable Limit (a flow state variable for recording the factor that limited the injection of previously transmitted data packets) are assigned the initial values of 1, 1 and 0, respectively. The flow state variables: cwnd, crt, wnd and Limit are stored in memory 206. The RateTimer is a timer for enforcing the inter-packet delay between consecutive packets of the same flow. The delay is defined by the variable, ipd. After resetting the RateTimer at step 410, process 400 proceeds to step 412 where execution returns to process 300 at step 306.

Application 112 passes a data packet to the congestion control system at step 306. The size of the data packet is determined and assigned to the variable nbytes at step 308. Step 310 checks whether the RateTimer has expired and decreases the RateTimer at step 312 if it has not expired. Steps 310 and 312 can also be implemented by suspending execution of process 300 at step 310 until the congestion control system receives a signal from a timer or clock (e.g., the system clock in server node 102) indicating expiration of a predetermined period of time. When the RateTimer expires, step 314 determines whether the combined size of the current window and size of the data packet to be transmitted is less than or equal to the flow's current window limit. If the combined size is less than or equal to the current window limit, step 316 calls process 1200 to update the limiting factor. Otherwise, execution of step 318 is suspended and, in the meantime, the receive acknowledgment module continues to update the window size as ACK packets are received, as described below in relation to the process shown in FIG. 5.

When the combined size is less than or equal to the current window limit, step 318 continues at step 320, which calls process 1100 to update the limiting factor. Steps 316 and 320 continue execution at step 322, which adds the size of the data packet to be transmitted to the current window size. At step 324, the data packet is transmitted to the receiver node 104. The value of ipd is recalculated at step 326 and, at step 328, ipd is set as the start time of the RateTimer. At step 330, the process continues at step 306 for any further data packets passed from application 112, or ends if there are no further data packets to be sent.

Figure 5:
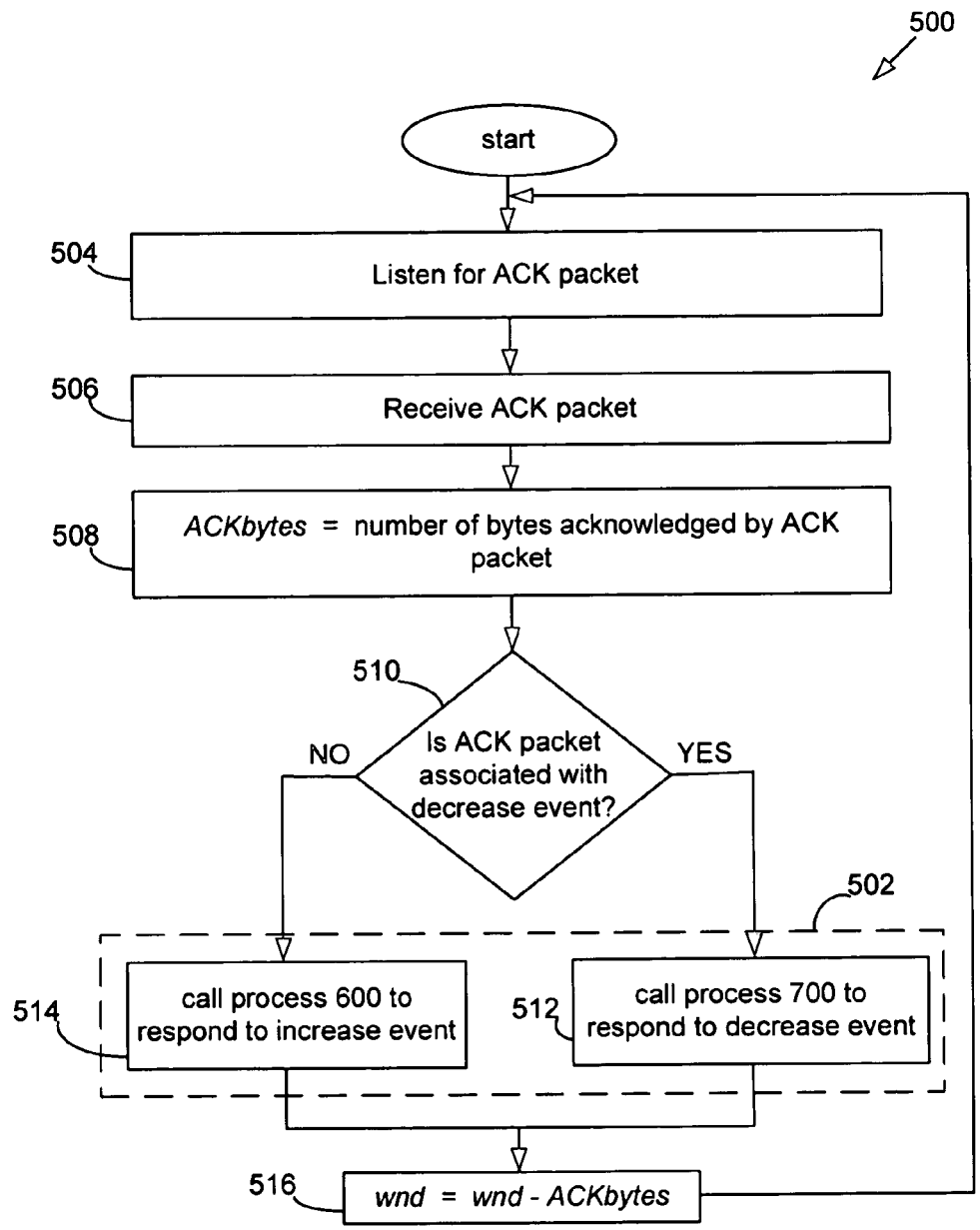
FIG. 5 is a flow diagram showing the processing of a received ACK packet in an embodiment of the present invention.

The flow diagram in FIG. 5 shows the process 500 for processing a received ACK packet and corresponds to the ReceiveAck( ) function as shown in pseudocode on page 28. Process 500 is executed in the receive acknowledgment module 212. The steps in box 502 relate to processes for responding to an increase or decrease event, and corresponds to the IncreaseEvent( ) and DecreaseEvent( ) functions as shown in pseudocode on pages 28 and 29. The processes for responding to increase or decrease events are executed in the increase/decrease module 214. When an ACK packet is received, process 500 adjusts the current window and either increases or decreases the flow window and/or rate limit depending on the type of event associated with the ACK packet.

Figure 6:
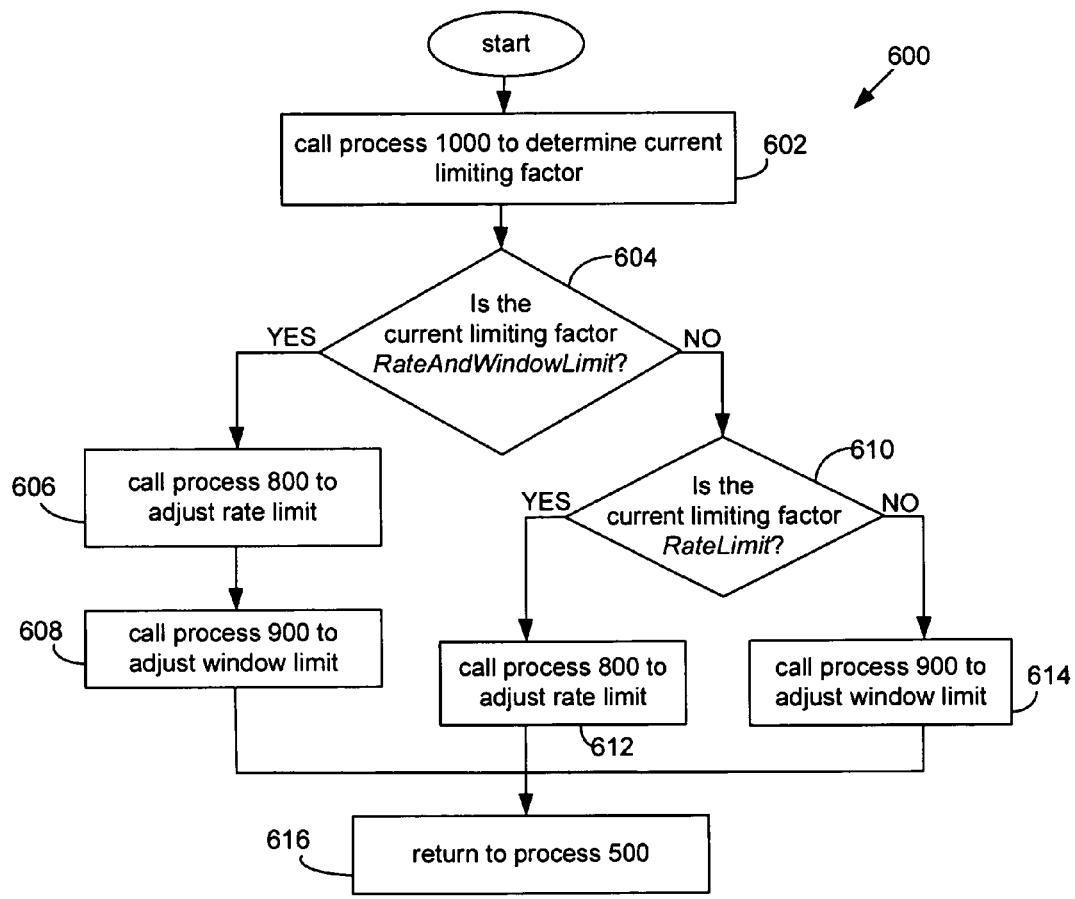
FIG. 6 is a flow diagram of the process in an embodiment of the present invention for responding to an increase event.
Figure 7:
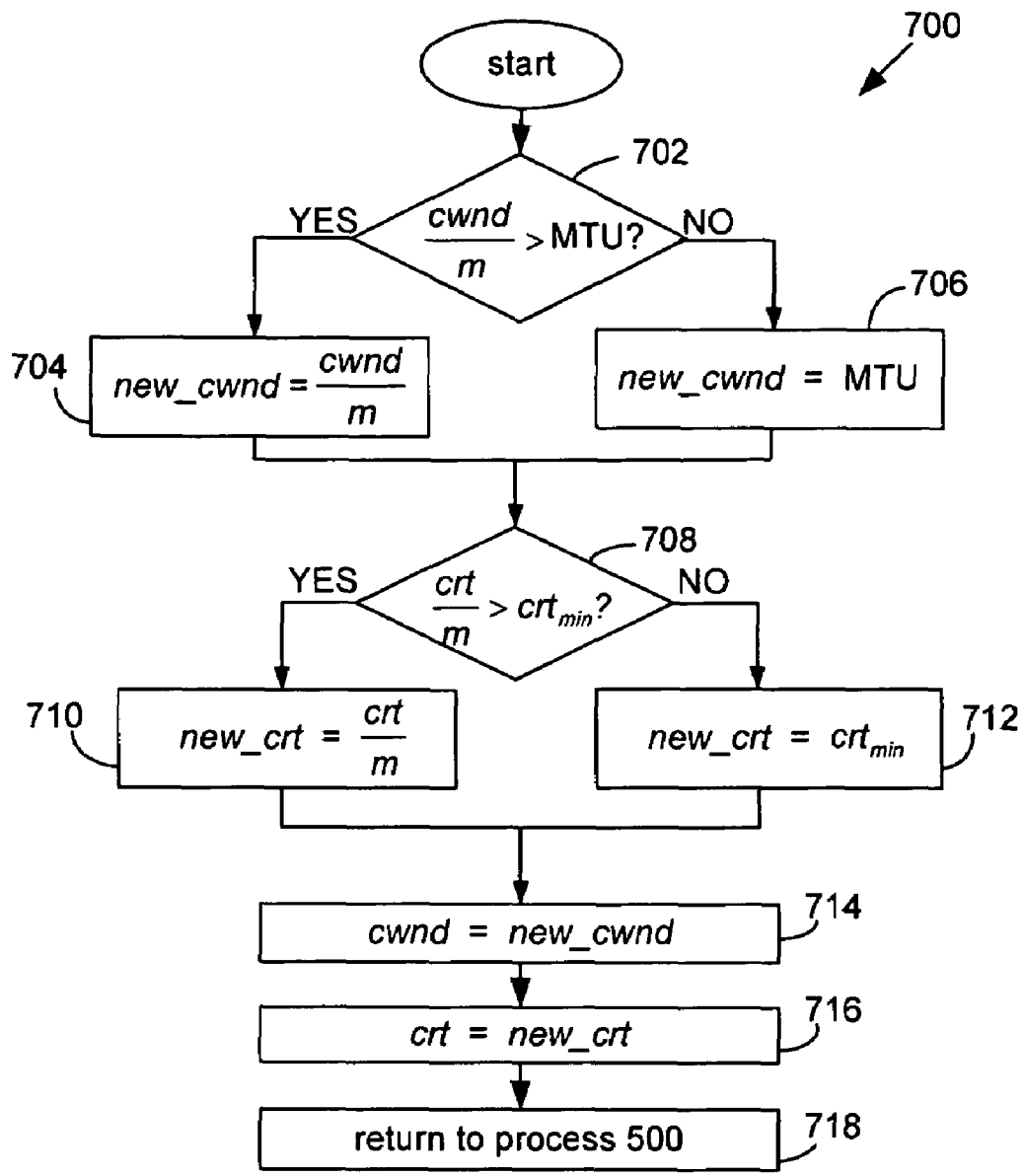
FIG. 7 is a flow diagram of the process in an embodiment of the present invention for decreasing the rate limit for a flow.

Process 700 of FIG. 7 responds to a decrease event, which causes the flow rate limit and window limit to be decreased. Process 600 of FIG. 6 responds to an increase event and causes either the flow rate limit, the window limit or both to be increased, depending on which factor is currently limiting the actual flow rate. In general, the Adjust versions of the functions (as shown in pseudocode on page 31) which increase only one limit (i.e., the rate or window limit) do not need to have the same behaviour as their respective Increase versions which are used when both limits are increased simultaneously. The amount by which the rate or window limit is increased is a function not only of their current values, but also a function of the number of bytes acknowledged by the ACK packet. This allows increase functions to have similar behaviour for flows operating at the same rate, even if they use packets with different sizes.

Process 500 begins at step 504 by listening on a communications port connected to network 108 for incoming ACK packets. An incoming ACK packet is received at step 506. At step 508, the variable ACKbytes is assigned the number of bytes acknowledged by the received ACK packet. If at step 510 the ACK packet is associated with a decrease event, process 700 is called at step 512 to perform a decrease event. Otherwise, process 600 is called at step 514 to perform an increase event. Steps 512 and 514 continue at step 516, which subtracts the number of bytes acknowledged by the ACK packet from the window size. The process 500 then continues listening for further ACK packets and processes them from step 504.

The congestion control system 110 can be used with many different rate and window adjustment functions. The pseudocode as shown in pseudocode on page 31 illustrates a particular response function implementation based on a traditional Additive Increase Multiplicative Decrease (AIMD) response function. AIMD is a source response function which has been shown to converge to a fair and efficient operating point. However, in other embodiments of the present invention, different response functions may be used, for example, the Fast Increase Multiplicative Decrease (FIMD) and Linear Inter-Packet Delay (LIPD) functions described in J. Santos, Y. Turner and G. Janakiraman, "End-to-end congestion control for InfiniBand" IEEE INFOCOM, April 2003 and the generic class of binomial congestion control increase/decrease functions described in D. Bansal and H. Balakrishnan "Binomial congestion control algorithms" *IEEE INFOCOM*, April 2001, and the complete contents of both papers are hereby incorporated herein by reference. Once either a window or rate limit has been determined using the techniques as discussed above in Santos and Bansal, the corresponding rate or window limit can be determined using either equation 6 or 11.

The flow diagram in FIG. 6 shows the process 600 for responding to an increase event which, for example, corresponds to the IncreaseEvent( ) function as shown in pseudocode on pages 28 and 29. The response to an increase event involves increasing the rate limit, window limit or both depending on the factor that is currently limiting the actual flow rate. Adjustment of the window limit and/or rate limit are performed by increase functions, which includes, for example, the processes described below in relation to FIGS. 8 and 9. Increase functions are defined such that in the absence of congestion the rate limit increases linearly with time, as a traditional AIMD rate response function. However, increase adjustments are not done continuously but only on increase events, such as those triggered by ACK packets. The amount of rate adjustment at each ACK reception should be determined such that the desired linear time increase behaviour is achieved. Process 600 begins by calling process 1000, at step 602, to determine the current limiting factor. As described below, the current limiting factor can either be the WindowLimit, RateLimit or RateAndWindowLimit. If step 604 determines that the current limiting factor is the RateAndWindowLimit, the process proceeds to step 606 and calls process 800 to adjust the rate limit and then calls process 900, at step 608, to adjust the window limit. Otherwise, the process proceeds to step 610 where, if the current limiting factor is the RateLimit, only the rate limit is adjusted by calling process 800 at step 612. Otherwise, only the window limit is adjusted by calling process 900 at step 614. Steps 608, 612 and 614 proceed to step 616, where execution returns to process 500 at step 516.

In one embodiment, the process for adjusting the rate limit at steps 606 and 612 are the same. Similarly, it is also preferable for the process for adjusting the window limit at steps 608 and 614 to be the same. However, in other preferred embodiments, different adjustment processes can be used at steps 606 and 612, and likewise for steps 608 and 614.

Figure 8:
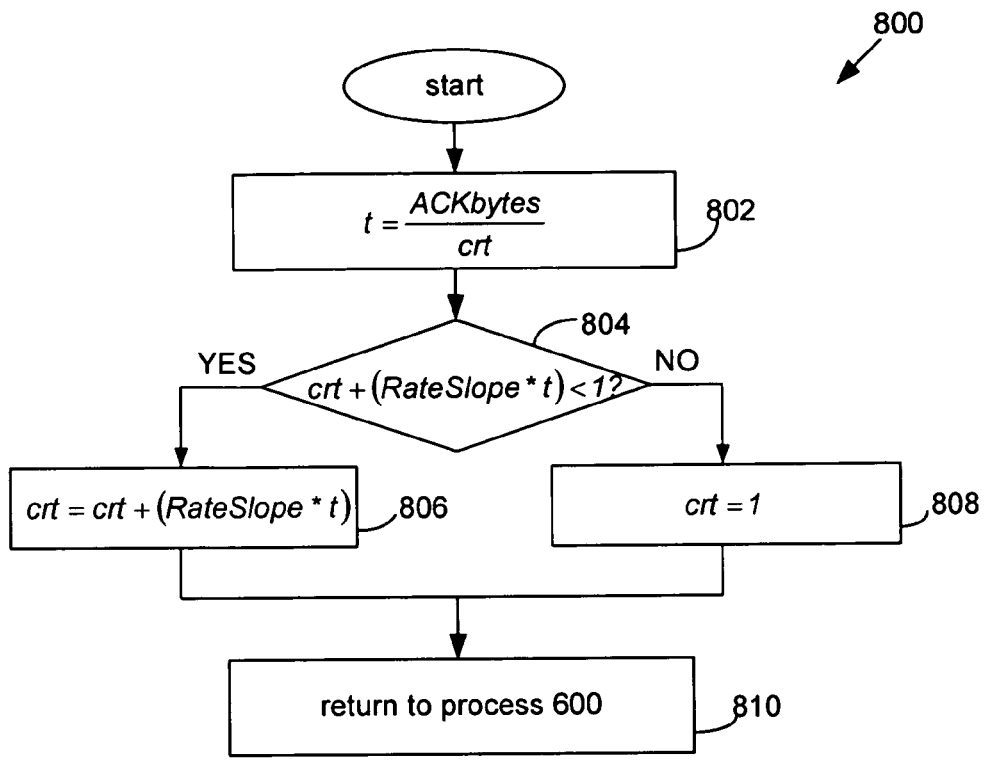
FIG. 8 is a flow diagram of the process in an embodiment of the present invention for increasing the rate limit for a flow in response to an increase event.

The flow diagram in FIG. 8 shows the process 800 for increasing the flow's rate limit in response to an increase event which, for example, corresponds to the IncreaseRate( ) and AdjustRate( ) functions as shown in pseudocode on page 31. At step 802, the estimated time interval between two most recently received ACK packets is calculated and assigned to variable t. In step 804, the minimum between the value 1 and the adjusted rate limit (being the result of crt+(RateSlope*t)) is determined, where RateSlope is a constant that defines the slope of the linear increase of the rate with time and RateSlope>0. If the adjusted rate limit is less than 1, then step 806 sets the adjusted rate limit as the new rate limit. Otherwise, at step 808, the rate limit is set as 1. Steps 806 and 808 proceeds to step 810, where execution returns to process 600.

Figure 9:
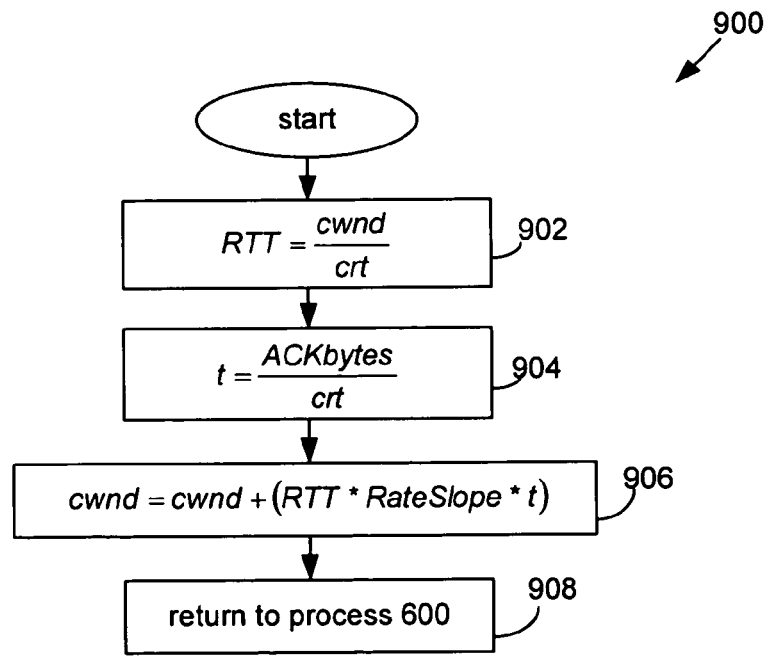
FIG. 9 is a flow diagram of the process in an embodiment of the present invention for increasing the window limit for a flow in response to an increase event.

The flow diagram in FIG. 9 shows the process 900 for increasing the flow's window limit in response to an increase event which, for example, corresponds to the Increasewindow( ) and AdjustWindow( ) functions as shown in pseudocode on page 31. Process 900 and the IncreaseWindow( ) and AdjustWindow( ) functions are defined to satisfy Equation 11 because if the rate limit has already been determined (e.g., at step 606) before determining the window limit (e.g., at step 608), the window limit should be adjusted such that the relationship in equation 11 is maintained. However, process 900 is also suitable for adjusting only the window limit, (e.g., at step 614), which, for example, corresponds to the AdjustWindow( ) function. At step 902, the round trip time (RTT) of a packet is calculated. At step 904, the estimated time interval between two most recently received ACK packets is calculated and assigned to the variable t. At step 906, the new adjusted window limit is calculated by the formula: cwnd+(RTT*RateSlope*t). Step 906 proceeds to step 908, where execution returns to process 600.

The flow diagram in FIG. 7 shows the process 700 for decreasing the flow's rate limit and corresponds to the DecreaseEvent( ) function, as shown in pseudocode on page 28. Upon a decrease event, both the window limit and the rate limit are decreased preferably by multiplicative functions, such as the functions DecreaseRate( ) and DecreaseWindow( ) as shown in pseudocode on page 31. Both the window limit and the rate limit are not decreased beyond their minimum values, MTU and $crt_{min}$ respectively. The minimum rate limit, $crt_{min}$, is an arbitrary constant and $crt_{min}=0$ is a valid value since $crt_{min} \geq 0$. The DecreaseRate( ) and DecreaseWindow( ) functions satisfy Equation 6.

Process 700 begins at step 702 by determining the maximum value between $$\frac{cwnd}{m}$$

and MTU, where m is a user-defined constant with a value greater than 1. The constant m has a small value greater than 1, because on each decrease event, the flow rate is decreased by a factor m. For example, with TCP congestion control, m has a value of 2. Since large values of m would result in drastic reductions in the flow rate upon each decrease event, such large values of m are undesirable. At step 704, the variable for the new window limit (new_cwnd) is assigned the value of $$\frac{cwnd}{m}$$

if the value of $$\frac{cwnd}{m}$$

is greater than the MTU. Otherwise, at step 706, new_cwnd is assigned the value of the MTU. At step 708, the maximum value between $$\frac{crt}{m}$$

and $crt_{min}$ is determined, where m is a user-defined constant, as described above, with a value greater than 1. At step 710, the variable for the new rate limit (new_crt) is assigned the value of $$\frac{crt}{m}$$

if the value of $$\frac{crt}{m}$$

is greater than $crt_{min}$. Otherwise, at step 712, new_crt is assigned the value of $crt_{min}$. At steps 714 and 716, the variables cwnd and crt are updated with the new window and rate limits, new_cwnd and new_crt, respectively. Step 716 proceeds to step 718, where execution returns to process 500.

As mentioned before, there are many different ways to determine which factor is currently limiting the actual flow rate. The pseudocode shown on page 28 illustrates an embodiment of a mechanism for determining the current limiting factor. However, many other variations for determining the current limiting factor could be proposed and used with the various embodiments of the congestion control system 110 described herein. The mechanism uses an additional flow state variable, Limit, which records what factor limited the injection of previously transmitted data packets. This variable is initialized to zero. Every time a packet is delayed due to the window limit, the value of variable Limit is increased by an amount equal to the number of bytes transmitted in that packet. On the other hand, if the packet is delayed by the rate limit instead, then the variable Limit is decreased by the same amount. Thus, a positive value for Limit indicates that more data was delayed by the window limit than by the rate limit, and a negative value for Limit indicates the opposite.

There are two thresholds which may be defined as constants, a negative LowThreshold and a positive HighThreshold. If Limit reaches HighThreshold, the window limit is considered to be the limiting factor, and if Limit reaches LowThreshold, the rate limit is considered to be the limiting factor. When LowThreshold<Limit<HighThreshold, both the window limit and the rate limit are considered limiting factors and the flow is in a balanced operating point. When Limit reaches either the HighThreshold or LowThreshold, the mechanism stops increasing or decreasing the value of Limit beyond the threshold, while the limiting factor continues to be the same. As soon as the limiting factor changes, Limit returns to the region considered as the balanced operating point region (i.e., LowThreshold<Limit<HighThreshold).

Figure 10:
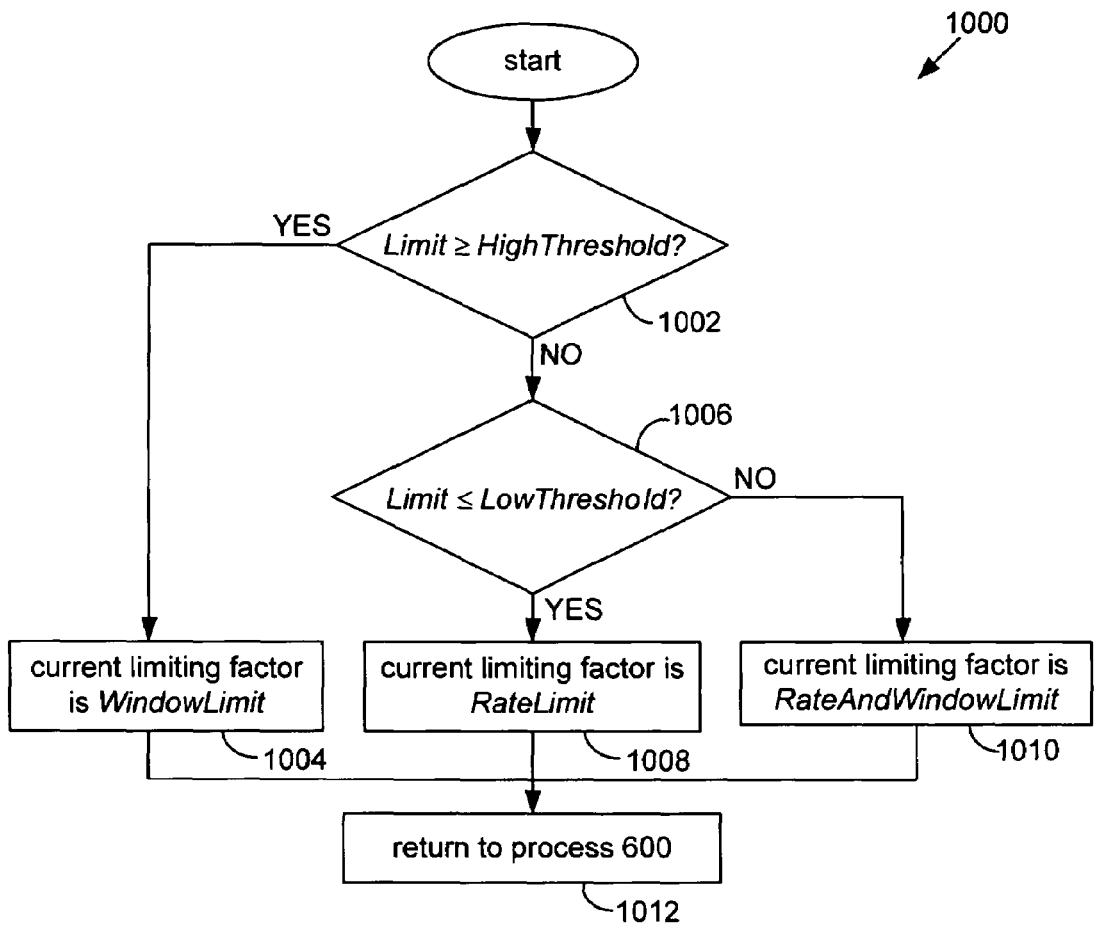
FIG. 10 is a flow diagram of the process in an embodiment of the present invention for determining a current limiting factor.

The flow diagram in FIG. 10 shows the process 1000 for determining the current limiting factor which, for example, corresponds to the CurrentLimitingFactor( ) function as shown in pseudocode on page 30. Process 1000 may be executed in the increase/decrease module 212. Process 1000 begins at step 1002 by determining whether the variable Limit is greater than or equal to the HighThreshold. If this is so, step 1004 determines the current limiting factor as the WindowLimit. If Limit is less than the HighThreshold, step 1006 determines whether Limit is less than or equal to the LowThreshold. If this is so, step 1008 determines the current limiting factor as the RateLimit. Otherwise, at step 1010, the current limiting factor is determined as the RateAndWindowLimit. Steps 1004, 1008 and 1010 proceeds to step 1012, which returns process 1000 to process 600 at step 604.

Figure 11:
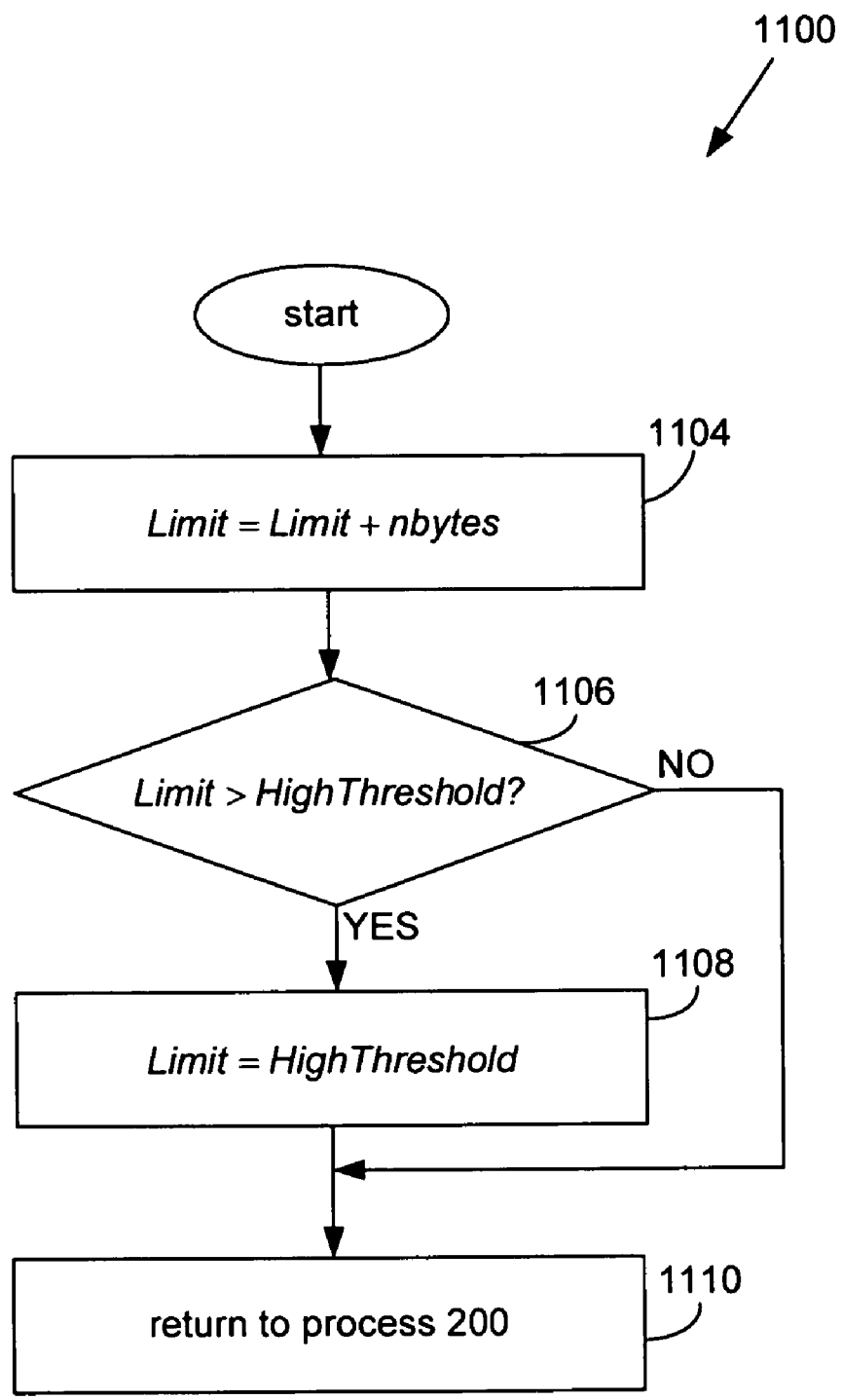
FIG. 11 is a flow diagram of the process in an embodiment of the present invention for updating a limit variable when the transmission of a data packet for a flow is delayed due to the window limit.

The flow diagram in FIG. 11 shows the process 1100 for updating the Limit variable when transmission of a data packet is delayed due to the window limit. Process 1100 corresponds, for example, to a part of the UpdateLimitingFactor( ) function as shown in pseudocode on page 30, and is executed in the update limiting factor module 210. Process 1100 begins at step 1104, which increases Limit by the number of bytes in the data packet (nbytes) to be sent to the receiver node 104. Then, step 1106 determines whether Limit is greater than the HighThreshold. If this is so, step 1108 sets Limit to be the value of the HighThreshold and, at step 1110, returns process 1100 to process 300 at step 322. Otherwise, step 1106 directly proceeds to step 1110, which returns process 1100 to process 300 at step 322.

Figure 12:
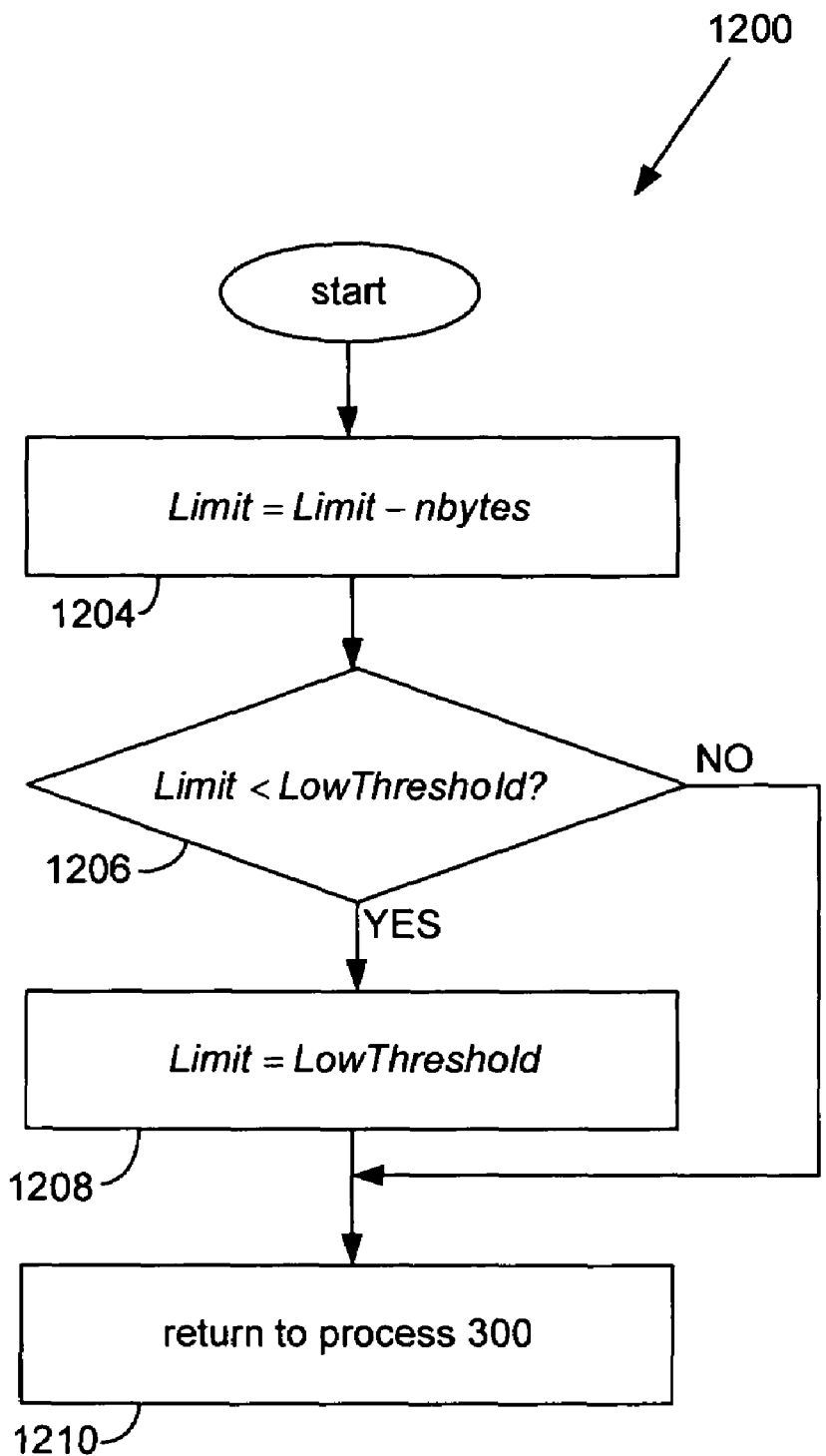
FIG. 12 is a flow diagram of the process in an embodiment of the present invention for updating a limit variable when transmission of a data packet for a flow is delayed due to the rate limit.

The flow diagram in FIG. 12 shows the process 1200 for updating the Limit variable when transmission of a data packet is delayed due to the rate limit. Process 1200 corresponds, for example, to a part of the UpdateLimitingFactor( ) function as shown in pseudocode on page 30, and is executed in the update limiting factor module 210. Process 1200 begins at step 1204, which decreases Limit by the number of bytes in the data packet (nbytes) to be sent to the receiver node 104. Then, step 1206 determines whether Limit is less than the LowThreshold. If this is so, step 1208 sets Limit to be the value of the LowThreshold and, at step 1210, returns process 1200 to process 300 at step 322. Otherwise, step 1206 directly proceeds to step 1210, which returns process 1200 to process 300 at step 322.

Pseudocode 1 - Hybrid Congestion Response Mechanism

```
Initialize( ):
 1:   cwnd = maximum packet size (MTU);
 2:   crt = 1,
 3:   wnd = 0;
 4:   Reset RateTimer;
Send(DataPacket):
 1:   nbytes = size of payload data on DataPacket;
 2:   if RateTimer not expired then
 3:      wait until RateTimer expires
 4:   end if
 5:   if (wnd + nbytes ≦ cwnd) then
 6:      UpdateLimitingFactor(RateLimit,nbytes);
 7:   else
 8:      wait until (wnd + nbytes ≦ cwnd);
 9:      UpdateLimitingFactor(WindowLimit,nbytes);
10:   end if
11:   wnd = wnd + nbytes;
12:   Transmit Packet;
13:   ipd = ((1/crt)− 1) * txttime(DataPacket);
14:   start RateTimer with value ipd;
ReceiveAck(AckPacket):
 1:   nbytes = number of bytes acknowledged by AckPacket;
 2:   if Ack is associated with a decrease event then
 3:      DecreaseEvent( );
 4:   else
 5:      IncreaseEvent( );
 6:   end if
 7:   wnd = wnd + nbytes;
DecreaseEvent( ):
 1:   new_cwnd = DecreaseWindow(crt,cwnd);
 2:   new_crt = DecreaseRate(crt,cwnd);
 3:   crt = new_crt;
```

Pseudocode 1 - Hybrid Congestion Response Mechanism
-continued

```
 4:   cwnd = new_cwnd;
IncreaseEvent(AckBytes):
 1:   if (CurrentLimitingFactor( ) == RateAndWindowLimit) then
 2:      new_crt = IncreaseRate(crt,cwnd,AckBytes);
 3:      new_cwnd = IncreaseWindow(crt,cwnd,AckBytes);
 4:      crt = new_crt;
 5:      cwnd = new_cwnd;
 6:   else if (CurrentLimitingFactor( ) == RateLimit) then
 7:      AdjustRate(crt,cwnd,AckBytes);
 8:   else
 9:      AdjustWindow(crt,cwnd,AckBytes);
10:   end if
11:   wnd = wnd − AckBytes;
```

Pseudocode 2 - Traffic injection limiting factor

```
Initialize( )
 1:   Limit = 0;
UpdateLimitingFactor(LastLimit,nbytes)
 1:   if (LastLimit == WindowLimit) then
 2:      if (Limit < HighThreshold) then
 3:         Limit = Limit + nbytes;
 4:         if (Limit > HighThreshold) then
 5:            Limit = HighThreshold;
 6:         end if
 7:      end if
 8:   else
 9:      if (Limit > LowThreshold) then
10:         Limit = Limit − nbytes;
11:         if (Limit < LowThreshold) then
12:            Limit = LowThreshold;
13:         end if
14:      end if
15:   end if
CurrentLimitingFactor( )
 1:   if (Limit >= HighThreshold) then
 2:      return WindowLimit;
 3:   else if (Limit <= LowThreshold) then
 4:      return RateLimit;
 5:   else
 6:      return RateAndWindowLimit
 7:   end if
```

Pseudocode 3 - An AIMD congestion response mechanism

```
DecreaseRate(crt,cwnd)
 1:   return Maximum(crt/m,crt_min);
DecreaseWindow(crt,cwnd)
 1:   return Maximum(cwnd/m,MTU);
IncreaseRate(crt,cwnd,nbytes)
 1:   t = nbytes/crt;
 2:   crt = Minimum(crt + RateSlope * t,1);
IncreaseWindow(crt,cwnd,nbytes)
 1:   rtt = cwnd/crt;
 2:   t = nbytes/crt;
 3:   cwnd = cwnd + rtt * RateSlope * t;
AdjustRate(crt,cwnd,nbytes)
 1:   IncreaseRate(crt,cwnd,nbytes)
AdjustWindow(crt,cwnd,nbytes)
 1:   IncreaseWindow(crt,cwnd,nbytes)
```

Many modifications will be apparent to those skilled in the art without departing from the scope of the present invention as hereinbefore described with reference to the accompanying drawings.

Although the present invention has been described in terms of varying embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for controlling congestion in a communications network, including:
   receiving congestion feedback data from acknowledgement packets transmitted in said network;
   using the acknowledgement packets to determine which of a window limit and a rate limit are causing congestion in the network;
   adjusting both the window limit and the rate limit based on said congestion feedback data to reduce network congestion; and
   injecting data packets onto said network according to both said window limit and said rate limit, wherein the window limit controls a number of packets in transit between source and destination nodes and the rate limit controls a rate at which the source node injects packets into the communications network.

2. A method according to claim 1, wherein said adjusting includes:
   decreasing said rate limit and said window limit if said network is determined to be congested based on said congestion feedback data.

3. A method according to claim 1, wherein said adjusting includes:
   increasing, based on a limiting factor, at least one of said rate limit and said window limit if said network is determined not to be congested based on said congestion feedback data.

4. A method according to claim 3, wherein said limiting factor is determined based on whether a transmission of a data packet was most recently limited by at least one of said rate limit and said window limit.

5. A method according to claim 4, wherein said race limit is increased if said limiting factor is determined by said rate limit.

6. A method according to claim 4, wherein said window limit is increased if said limiting factor is determined by said window limit.

7. A method according to claim 4, wherein both said rate limit and said window limit is increased if said limiting factor is determined by both said rate limit and said window limit.

8. A method according to claim 4, wherein said limiting factor is a value between a predetermined high threshold and a predetermined low threshold.

9. A method according to claim 4, wherein said determining of said limiting factor includes increasing or decreasing said limiting factor by an amount corresponding to a size of the data packet for which injection was limited.

10. A method according to claim 9, wherein said limiting factor is increased by said amount if the transmission of a data packet was limited by said window limit.

11. A method according to claim 9, wherein said limiting factor is decreased by said amount if the transmission of a data packet was limited by said rate limit.

12. A method according to claim 1, wherein said adjusting is performed by an Additive Increase Multiplicative Decrease response process.

13. A system for controlling congestion in a communications network, including:
   a congestion control module that adjusts at least one of a window limit and a rate limit based on congestion feedback data from acknowledgement packets in said network, uses the acknowledgment packets to determine which of said window limit and said rate limit cause congestion in said network, and limits injection of packets into said network according to both said window limit and said rate limit, wherein the window limit controls a number of packets in transit between source and destination nodes and the rate limit controls a rate at which the source node injects packets into the communications network.

14. A system according to claim 13, wherein said congestion control module is adapted to decrease said rate limit and said window limit if said network is determined to be congested based on said congestion feedback data.

15. A system according to claim 13, wherein said congestion control module is adapted to increase, based on a limiting factor, at least one of said rate limit and said window limit if said network is determined not to be congested based on said congestion feedback data.

16. A system according to claim 15, further including means for determining said limiting factor based on whether a transmission of a data packet was most recently limited by at least one of said rate limit and said window limit.

17. A system for controlling congestion in a communications network, comprising:
   means for receiving congestion feedback data from acknowledgement packets transmitted in said network;
   means for using the congestion feedback data from the acknowledgement packets to determine which of a window limit and a rate limit are causing congestion in the network;
   means for adjusting at least one of the window limit and the rate limit based on said congestion feedback data; and
   means for injecting data packets onto said network according to both said window limit and said rate limit.

18. A system according to claim 17, wherein said means for adjusting includes:
   means for decreasing said rate limit and said window limit if said network is determined to be congested based on said congestion feedback data.

19. A system according to claim 17, wherein said means for adjusting includes:
   means for increasing, based on a limiting factor, at least one of said rate limit and said window limit if said network is determined not to be congested based on said congestion feedback data.

20. A system according to claim 19, wherein said limiting factor is determined based on whether a transmission of a data packet was most recently limited by at least one of said rate limit and said window limit.

* * * * *

UNITED STATES PATENT AND TRADEMARK OFFICE
CERTIFICATE OF CORRECTION

| | |
|---|---|
| PATENT NO. | : 7,512,066 B2 |
| APPLICATION NO. | : 10/814073 |
| DATED | : March 31, 2009 |
| INVENTOR(S) | : Jose Renato Santos et al. |

It is certified that error appears in the above-identified patent and that said Letters Patent is hereby corrected as shown below:

In column 15, line 39, in Claim 5, delete "race" and insert -- rate --, therefor.

Signed and Sealed this

Twenty-eighth Day of July, 2009

JOHN DOLL
*Acting Director of the United States Patent and Trademark Office*